Aug. 28, 1928.

J. KELLEHER 1,681,939

TUNNEL KILN

Filed July 17, 1925

James Kelleher  Inventor
By his Attorneys
Edwards, Sager & Bower.

Patented Aug. 28, 1928.

1,681,939

UNITED STATES PATENT OFFICE.

JAMES KELLEHER, OF CHIPPAWA, ONTARIO, CANADA, ASSIGNOR TO HARPER ELECTRIC FURNACE CORPORATION, A CORPORATION OF NEW YORK.

TUNNEL KILN.

Application filed July 17, 1925. Serial No. 44,184.

This invention relates to tunnel kilns where articles such as bricks, cups, saucers, or other ceramic ware, are carried through the kiln on vehicles or carriers mounted on tracks or other guiding supports. Due to the high temperature in the kiln, the tracks on which such vehicles run are apt to become warped. Furthermore, at this high temperature any oil used as a lubricant for the bearings of the vehicle wheels is apt to become carbonized and gummy, and interfere with the free motion of the vehicle. One of the major objects of my invention is to avoid these disadvantages by providing an improved means for maintaining the track and the wheel bearings of the vehicle cool.

Other objects of my invention will appear from the following description taken in connection with the accompanying drawing, wherein Fig. 1 is a longitudinal elevation of a tunnel kiln trackway constructed in accordance with one form of my invention.

Figure 1:
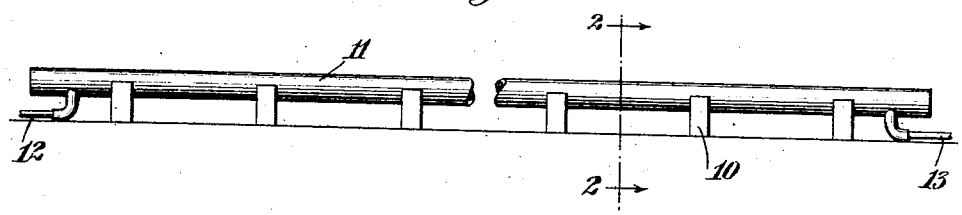

Referring to the drawing, the trackway comprises sleepers 10, carrying rails 11 in the form of pipes closed at both ends in such a manner that such pipes may be placed end to end in abutting contact, and if desired welded together, to form a continuous rail. Water is permitted to enter each pipe at one end through a passage 12 and pass out of the pipe at the other end through a passage 13, keeping the pipe cool and preventing expansion.

Figure 2:
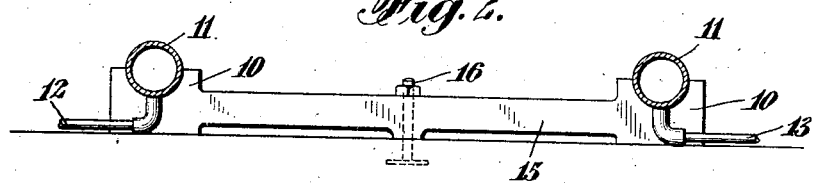
Fig. 2 is an enlarged transverse section taken on the line 2—2 of Fig. 1.

As shown in Fig. 2, opposite sleepers 10 are joined by a tie 15, which is secured to the floor of the tunnel by a bolt 16. The object of this construction is that the sleeper and tie can be cast in one piece grooved to fit the pipes forming the rails and the whole bolted to the floor by the one bolt 16. The whole track may be laid out on one central line, thereby permitting greater ease in aligning the tracks with the sides of the tunnel and procuring better clearance for the cars.

Figure 3:
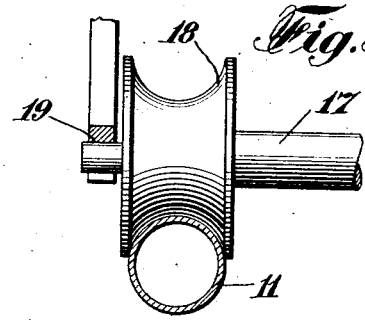
Fig. 3 is an enlarged detail section through one of the track rails showing a vehicle wheel on said rail and a bearing in which said wheel is journalled.

Referring to Fig. 3, 17 represents one end of a truck axle carrying the wheel 18, which is grooved to fit around the upper surface of the rail pipe 11. This axle is journalled in bearings 19 formed at the sides of the truck body. The truck wheel 18 is of small diameter and wide, and being grooved, contacts with the pipe 11 for a considerable distance around the surface of the pipe. If the body of the truck is at such a temperature that any oil lubricant used in the bearings 19 would ordinarily become carbonized and gummy, in the arrangement shown water flowing through the pipe would not only maintain the pipes 11 cool, but by conduction through the wheel 18 would maintain the bearing 19 cool and keep the oil in said bearing sufficiently cool to prevent carbonization.

Another advantage gained by the use of a track rail of the form shown is that any article such as a small piece of brick, sand, dust, broken ware, etc. falling on this rail will slide off to one side and prevent the jolting of the cars as they pass over the track and their possible derailment. If, on the other hand, a piece of brick, for example, should remain on top of the rail, the peculiar shape of the wheel in contact with the the rail will have a tendency to crush the piece of brick and force it downwards and off the rail before it passes the brick.

I claim:

1. In a tunnel kiln means for conveying material therethrough comprising a track having rails composed of hollow tube sections fitted end to end in abutting contact to form a continuous rail, means for circulating a cooling medium in one direction through said tube sections, and a carrier supported by said track.

2. In a tunnel kiln means for conveying material therethrough comprising a track having rails composed of hollow tube sections closed at their ends so as to fit end to end in abutting contact and to form a continuous rail, means for circulating a cooling medium through each of said tube sections, and a carrier supported by said track.

3. In a tunnel kiln means for conveying material therethrough comprising a track having rails composed of hollow tube sections closed at their ends so as to fit end to end in abutting contact and form a continuous rail, means for circulating a cooling medium through said tube sections, and a carrier supported by said tracks and having metal wheels and journals cooled by conduction of heat through said wheels to said track.

4. In a tunnel kiln, a track adapted to support carriers for material to be heat-treated and comprising ties formed with grooves in their upper surfaces near their outer ends, rails formed of pipes supported in said grooves, said pipes having passages for supplying cooling medium to the interior thereof, and means for securing said ties at their centers to the floor of said kiln.

JAMES KELLEHER.